May 26, 1959  R. P. MAZZAGATTI ET AL  2,888,571

RADIOACTIVITY MEASURING

Filed July 6, 1954  2 Sheets-Sheet 1

2,888,571

RADIOACTIVITY MEASURING

Roy P. Mazzagatti, Bellaire, and O. D. Stephens and Archie S. Conners, Houston, Tex., assignors to The Texas Company, New York, N.Y., a corporation of Delaware Application July 6, 1954, Serial No. 441,376

7 Claims. (Cl. 250—83.6)

This invention relates to the detecting and measuring of penetrative radiation and, more particularly, to a device of the counter or gas amplification, electrical pulse producing type, for measuring the intensity of such radiation as gamma rays. The principal object of the invention is the provision of a device of this type which will be stable in operation, which will have a substantially unlimited lifetime, and which will have an efficiency much higher than the conventional Geiger-Mueller counter and other gamma ray detectors now being used.

In making intensity measurements of such radiation as gamma rays, the Geiger-Mueller counter has been used frequently in the past. The common Geiger-Mueller counter usually comprises a cylinder of metal forming a cathode sealed within a glass envelope or casing and through the center of which cylinder is disposed a fine wire forming the anode. The envelope usually contains a suitable gas at a subatmospheric pressure and the device is connected in an electrical circuit so that the anode wire is maintained at a positive potential with respect to the cylindrical cathode. Normally the potential difference between the cathode and the anode is nearly, but not quite, high enough to cause a discharge to take place; however, if a particle or ray capable of ionizing the gas passes into the detector, ionization of the gas will take place and a discharge will occur. The output of the device is usually led to a suitable amplifier and then to a recording instrument capable of registering the number of discharges of the counter. This type of radiation intensity measuring instrument is useful in many instances, but for detecting the presence of gamma rays it has a fairly low efficiency.

In the United States Letters Patent No. 2,512,773, granted June 27, 1950, to Gerhard Herzog and Allen D. Garrison, a gaseous filling for gamma ray detectors is disclosed, this filling comprising a mixture of one of the rare gases, argon, neon or krypton and anhydrous ammonia. As is set forth in that patent, it has been found that a mixture comprising 2 or 3 percent anhydrous ammonia, and 97 or 98 percent argon, neon or krypton, constitutes a gaseous filling for gamma ray counters or detectors, which provides a substantially unlimited lifetime for the detector in which it is used. As is well known, after a few hundred thousand counts or pulses have been registered by a detector of the conventional Geiger-Mueller type, the detector then becomes substantially useless, and the old filling must be removed and the counter again filled with a fresh gas. As is pointed out in the Herzog-Garrison patent, when a detector of this type has been properly filled with a mixture of one of the rare gases, argon, neon, or krypton, and anhydrous ammonia, the filling does not deteriorate, and it is consequently not necessary to disassemble the detector and to refill it with fresh gas.

As will be pointed out more in detail hereinafter, further experimentation along this line has shown that the dead time of one of these detectors can be materially shortened by using certain mixtures of some of these rare gases, together with anhydrous ammonia. By "dead time" is meant the time interval, after recording a count, that the counter is completely insensitive and does not detect other ionizing events occurring inside it (see "Electron and Nuclear Counters," by Serge A. Korff, published by D. Van Nostrand Co., Inc., 1946, page 16). This dead time is usually of the order of microseconds, and it is obvious that the shorter this dead time can be made, the more gamma rays can be registered by the detector for any unit of time. There are instances, particularly where a high intensity of gamma rays is to be measured, that this matter of the length of the dead time becomes very important.

In the U.S. Letters Patent No. 2,397,071, granted March 19, 1946, to D. G. C. Hare, a gamma ray detector is disclosed in which the cathode electrode, instead of comprising a single metallic cylinder, as in the case of the conventional Geiger-Mueller counter, is formed of a plurality of parallel, separated, thin metallic plates, arranged in a bank, the bank of plates being provided with one or more series of lateral holes through the center of which an anode wire is disposed. The cathode and anode electrodes are housed within a suitable casing or envelope containing an ionizable gas filling, as in the case of the conventional Geiger-Mueller counter. It has been found that a counter of this multi-cathode plate type has an efficiency of from five to ten times that of the conventional counter of the same volume.

Experiments which have been made with a gamma ray counter or detector of the type disclosed in the Hare patent, and containing a gaseous filling of a type disclosed in the Herzog-Garrison patent, i.e., a mixture of argon and anhydrous ammonia, has an average dead time of about 100 microseconds. As stated above, in certain instances where it is necessary to measure intense gamma radiation, such, for example, as when making an induced gamma ray log of a well or bore hole, it is very desirable to decrease this dead time to the very minimum without, of course, affecting adversely the operation of the detector in other ways.

In accordance with the present invention, a gaseous filling has been provided, comprising a mixture of argon and helium, with a small amount of anhydrous ammonia, and it has been found that when such a mixture is used in a detector of the type described in the above-mentioned Hare patent, the dead time of the detector can be reduced as much as 50 percent, without adversely affecting the operation of the detector. Experiments have shown that with a mixture of these three gases, the more helium present, the shorter will be the dead time of the detector. However, it has been noted that there is a limit to which this dead time can be reduced without adversely affecting the signal characteristics of the detector. Thus, when using an excessive amount of helium, the resulting signal characteristics indicate a malfunctioning of the gas quenching action in which spurious counts are produced. It has been found that there is an optimum condition where the amount of helium, as compared to argon, is such that the dead time is materially reduced without any adverse effect on the signal characteristics of the detector. Experiments have shown that a very satisfactory mixture of these gases comprises about 3 percent ammonia, 20 percent argon, and 77 percent helium. When such a mixture was used in a gamma ray counter of the type disclosed in the Hare patent, the dead time was reduced from 100 to 50 micro-seconds, and this means, of course, that the efficiency is increased, particularly at high counting rates. Furthermore, this gas mixture results in a greater peak signal amplitude than for equal conditions when using ammonia and argon or helium. It has also been found that the plateaus which are obtained when using this mixture of argon, helium and ammonia are better than those obtained when using a gaseous mixture of ammonia and argon alone.

For a better understanding of the invention, reference may be had to the accompanying drawing, in which Fig. 1 is a diagrammatic view of a Geiger-Mueller counter of the conventional type;

Figure 1:
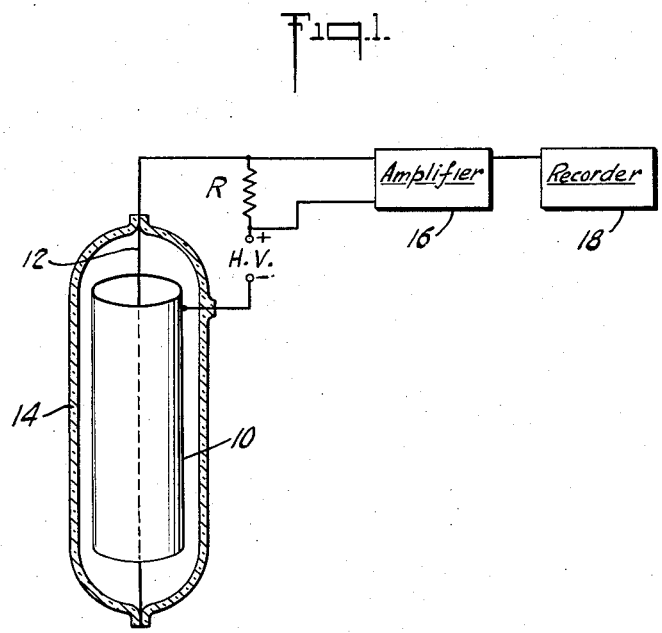

Referring to the drawing, the conventional Geiger-Mueller counter shown in Fig. 1 consists of a thin walled, metal tube or cylinder 10 with a very thin wire comprising the anode 12 spanned axially and insulated from the cathode cylinder. These electrodes are disposed in an envelope 14, commonly a glass tube, which contains a gas, e.g., hydrogen, at a fairly low pressure, say, 5–10 cm. of mercury. The wire 12 is maintained at a positive potential with respect to the cylinder and a fairly high resistance R is placed in the circuit. Normally, the potential difference between the cathode 10 and the wire 12 is nearly, but not quite, high enough to cause an electrical discharge to take place. If an ionizing ray passes into the detector, a discharge may take place with a current flow of the order of a few microamperes and this causes a voltage drop across the resistance R. The discharge will cease after a very short period of time. By amplifying the sudden voltage drop across R in a suitable amplifier 16, a mechanical recorder or other device 18 capable of registering the discharges of the counter may be actuated. After the discharge has ceased, the counter should again be in condition to register the passage of another ionizing ray.

While a conventional Geiger-Mueller counter has been described above, instead of the multi-cathode plate detector described in the Hare patent, it is to be understood that the principles of operation are substantially the same, and that the gaseous fillings which have been described can be used in the Geiger-Mueller type detector, as well as in the detector of the multi-cathode plate type.

Figure 2:
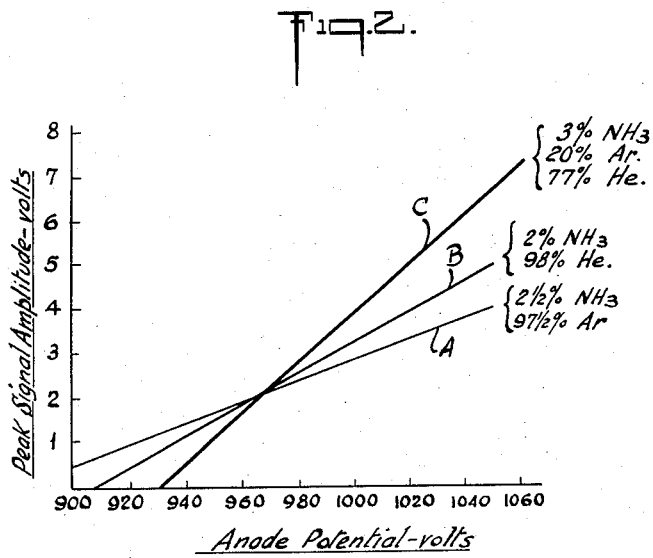
Fig. 2 is a graph showing the peak signal characteristics of three different gas mixtures when used in a detector of the type described in the aforementioned Hare patent.

In Fig. 2 are shown three curves indicating the peak signal amplitude in volts of a detector of the multi-cathode plate type, as a function of the anode potential for three different mixtures of gases. Curve A was obtained when the detector contained a filling of 2½ percent ammonia and 97½ percent argon. Curve B was obtained with the same detector, but the detector contained a mixture of 2 percent ammonia and 98 percent helium, while curve C was also obtained with the same detector, but containing a mixture of 3 percent ammonia, 20 percent argon and 77 percent helium. It will be noted that the last-mentioned mixture results in a greater peak signal amplitude than, for equal conditions, using ammonia and either argon or helium.

Figure 3:
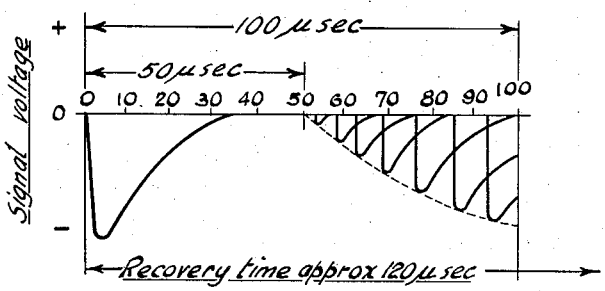
Fig. 3 shows the pulse characteristics of a detector filled with the preferred gas mixture when viewed on a cathode ray oscilloscope.
Figure 4:
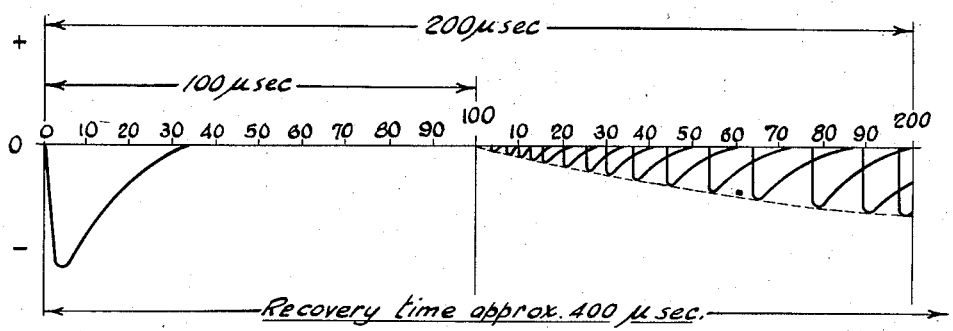
Fig. 4 is similar to Fig. 3, and shows the pulse characteristics of a detector when filled with a gas mixture of 3 percent ammonia and 97 percent argon.

Fig. 3 represents the image on a cathode ray oscilloscope set for 100 micro-seconds sweep, and obtained when using a detector containing the preferred filling of 3 percent ammonia, 20 percent argon and 77 percent helium. It will be noted that the dead time for this detector, i.e., the time required for the detector to be in condition to respond to subsequent gamma rays, is approximately 50 microseconds. Fig. 4 is similar to Fig. 3, but the oscilloscope is set for a 200 microsecond sweep, and this being obtained when using a detector containing a filling of 2½ percent ammonia and 97½ percent argon. It will be noted that the dead time of this detector is 100 microseconds, or twice that of the detector containing the preferred gaseous mixture. Figs. 3 and 4 were made from photographs which were taken showing the operation of the two detectors when a very high counting rate was being registered, so as to indicate the counter dead time and recovery time. The recovery time is defined as the time interval, after recording a count, before the pulses produced by the next ionizing event in the counter are of full size. It will be noted that the recovery time when using the preferred gas mixture is much less, i.e., about 30 percent, of that when using the ammonia-argon mixture.

Figure 5:
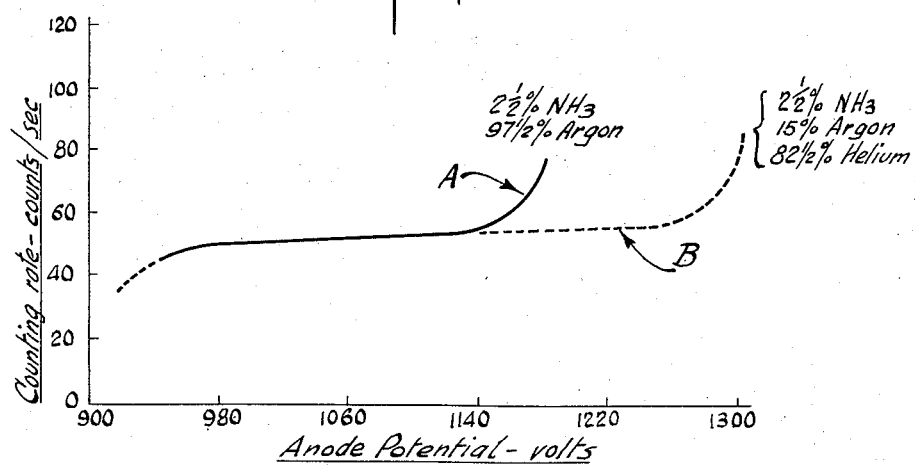
Fig. 5 is a graph showing the plateaus obtained with the same detector but using different gas mixtures.

In Fig. 5 curve A represents the plateau obtained with a multi-cathode plate detector, when using a gaseous filling of 2½ percent ammonia and 97½ percent argon, while curve B of this figure represents the plateau obtained with the same detector while using a mixture comprising 2½ percent ammonia, 15 percent argon and 82½ percent helium. It will be noted that the plateau indicated in curve B is better than that indicated in curve A.

While the preferred mixture has been described as consisting of 3 percent ammonia, 20 percent argon and 77 percent helium, it is to be understood that these proportions can be varied somewhat while still providing an effective filling. It can be said generally that the ammonia constituent should be between 0.1 and 10 percent of the total, that the remainder may consist of from 25% to 80% helium and from 19.9% to 65% argon and that the helium should preferably constitute the major proportion of the remainder.

Obviously, many other modifications and variations of the invention as hereinbefore set forth may be made without departing from the spirit and scope thereof and only such limitations should be imposed as are indicated in the appended claims.

We claim:

1. A radiation detecting device comprising a sealed housing, anode and cathode electrodes within said housing, said electrodes being adapted to be connected to a source of high potential, and a gaseous filling within the housing, said filling comprising a mixture of helium, argon and anhydrous ammonia.

2. A device as described in claim 1 in which said gaseous filling consists of from 0.1% to 10% anhydrous ammonia with the remainder having helium as its major portion and commercially pure argon as its minor portion.

3. A device as described in claim 1 in which said filling consists of about 3% anhydrous ammonia, 77% helium and 20% commercially pure argon.

4. A gamma ray detecting device of the gas amplification, electrical pulse producing type comprising a sealed housing, a cathode and an anode disposed within said housing, means for impressing a high potential across said cathode and said anode and a gaseous filling in said housing consisting of a mixture of argon, helium and anhydrous ammonia.

5. A device as described in claim 4 in which said gaseous filling consists of a small amount of anhydrous ammonia, a major portion of helium and an intermediate portion of argon.

6. A device as described in claim 4 in which said gaseous filling consists of from 0.1% to 10% anhydrous ammonia, with the remainder having helium as its major portion and commercially pure argon as its minor portion.

7. A device as described in claim 4 in which said gaseous filling consists of from 0.1% to 10% anhydrous ammonia, from 25% to 80% helium and from 19.9% to 65% argon.

References Cited in the file of this patent

UNITED STATES PATENTS

| | | |
|---|---|---|
| 2,599,352 | Schneider | June 3, 1952 |
| 2,606,296 | Simpson | Aug. 5, 1952 |
| 2,715,195 | Friedman | Aug. 9, 1955 |